United States Patent [19]

Doner et al.

[11] Patent Number: 6,147,206
[45] Date of Patent: *Nov. 14, 2000

[54] ISOLATION OF HEMICELLULOSE FROM CORN FIBER

[75] Inventors: Landis W. Doner, Wyndmoor, Pa.; Gregory A. Sweeney, Lebanon, N.J.; Kevin B. Hicks, Malvern, Pa.

[73] Assignee: National Starch and Chemical Investment Holding Corporation, Wilmington, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 09/039,153

[22] Filed: Mar. 13, 1998

Related U.S. Application Data

[63] Continuation-in-part of application No. 08/818,187, Mar. 14, 1997, abandoned.

[51] Int. Cl.⁷ .................................................. C08B 37/14
[52] U.S. Cl. ....................... 536/128; 536/123; 536/123.1; 536/114; 424/195.1; 435/99; 435/101; 435/95; 435/277; 435/274
[58] Field of Search ............................. 435/101, 99, 277, 435/95, 274; 424/195.1; 536/123, 123.1, 128, 114

[56] References Cited

U.S. PATENT DOCUMENTS

| | | |
|---|---|---|
| 1,819,233 | 8/1931 | Darling . |
| 2,709,699 | 5/1955 | Wolf et al. ............................... 260/209 |
| 2,801,955 | 8/1957 | Rutenberg et al. .......................... 195/9 |
| 2,868,778 | 1/1959 | Watson et al. ........................... 260/209 |
| 3,716,526 | 2/1973 | Schweiger ................................ 260/212 |
| 4,038,481 | 7/1977 | Antrim et al. ............................ 536/56 |
| 4,600,693 | 7/1986 | Kindle et al. ........................... 435/176 |
| 4,649,113 | 3/1987 | Gould ..................................... 435/165 |
| 4,806,475 | 2/1989 | Gould ..................................... 435/165 |
| 4,927,654 | 5/1990 | Barnett et al. .......................... 426/548 |
| 4,957,599 | 9/1990 | Chou et al. ............................... 162/78 |
| 5,057,334 | 10/1991 | Vail ....................................... 426/634 |
| 5,112,964 | 5/1992 | Aoe et al. ................................ 536/56 |

OTHER PUBLICATIONS

Doner et al., "Isolation of Hemicellulose from Corn Fiber by Alkaline Hydrogen Peroxide Extraction", *Cereal Chemistry*, 74(2):176–181.

Lachenal et al., "Hydrogen Peroxide as a Delignifying Agent", *Tappi*, vol. 63(4), Apr. 1980.

Hromadkova et al., "Isolation and Characterization of Hemicelluloses of Corn Hulls", Chem. Papers 49(2) (1995), pp. 97–101.

Ebringerova et al., "Recovery of Xylans from Annuals", Chemical Abstracts, vol. 109:8277 (1988) and CS-A-244591.

*Primary Examiner*—Francisco Prats
*Attorney, Agent, or Firm*—Karen G. Kaiser, Esq.

[57] ABSTRACT

This invention pertains to a high yield process for producing high quality corn fiber gum by hydrogen peroxide treatment of corn fiber during alkaline extraction and/or after obtaining the alkaline extract of milled corn fiber. This process comprises the steps:

a) mixing corn fiber with an alkaline solution to form a slurry and extract hemicellulose;

b) treating the slurry with hydrogen peroxide at a pH of about 10.0 to 12.5; and c) separating out the insoluble fractions from the corn fiber slurry to yield corn fiber gum.

The corn fiber gum produced by this process is highly soluble in water and provides low viscosity solutions which are nearly devoid of color over a wide pH range. The corn fiber gum lacks objectionable flavor and aroma. The corn fiber gum is useful for a variety of applications, including film formation and to thicken, emulsify, stabilize and/or extend aqueous solutions and suspensions.

21 Claims, 3 Drawing Sheets

ISOLATION OF HEMICELLULOSE FROM CORN FIBER

This application is a continuation-in-part of U.S. Ser. No. 08/818,187 filed Mar. 14, 1997, now abandoned.

BACKGROUND OF THE INVENTION

1. Field of the Invention

Corn fiber is an abundant low-valued by-product of corn wet- and dry-milling industries, and for many years there has been an interest in developing more valuable products from it. The corn fiber gum (hemicellulose B) fraction is the most unique of the carbohydrate components of fiber and is potentially very useful. For corn fiber gum to attract significant commercial interest, however, it should be colorless and lack the flavors and aromas normally associated with corn. This invention pertains to a process for the preparation of corn fiber gum which optimizes a yield of a white, high quality product.

2. Description of Related Art

For many years there has been an interest in developing more valuable products from corn fiber. Hemicellulose is the major component of corn fiber (38–57%), followed by starch (10–30%), protein (15%), cellulose (15%), oil (about 3.7%) and other substances such as lignin and ash (3%), (Osborn and Chen, (1984) *Starch/Staerke*. vol. 36, pp. 393–395; Carlson, T. (1994) In: *Proc. Corn Utilization Conference V.* St. Louis, Mo.). The actual yields of corn fiber gum from corn fiber and bran, even on a dry and starch-free basis, are quite variable and largely a function of the conditions used for its isolation.

Early corn fiber gum was prepared (Wolf, et al. (1953) *Cereal Chemistry*. vol. 30, pp. 451–470) by boiling corn fiber for one hour at pH 10.5–11.5 followed by hot water extraction. Later efforts to lighten the color of corn fiber gum resulted in extractions using sodium or calcium hydroxide, or combinations of the two, at various temperatures. Extracts using calcium hydroxide were the lightest in color and were further lightened by treatment with activated carbon. Yields in such cases were about 27%, and the hemicellulose A and B fractions were not separated. In addition, several processes for producing the arabinoxylan (hemicellulose B) fraction of fiber have been described in the patent literature, using various conditions of alkaline extraction (Wolf, supra; Rutenberg and Herbst, U.S. Pat. No. 2,801,955, 1957; Watson and Williams, U.S. Pat. No. 2,868,778, 1959; Schweiger, U.S. Pat. No. 3,716,526, 1973; Antrim and Harris, U.S. Pat. No. 4,038,481, 1977).

Later, Gould (U.S. Pat. No. 4,806,475, 1989) described a process for producing cellulosic products by treating non-woody lignocellulosic agricultural byproducts with an aqueous solution of strong alkali and hydrogen peroxide. The lignin portion was thus solubilized, thereby enabling the separation of the non-soluble cellulosic portion from the soluble lignin portion. Chou, et al. (U.S. Pat. No. 4,957,599, 1990) also described a process for delignifying and bleaching lignocellulosic material. The material was first treated with an alkaline solution free of peroxide, then an alkaline peroxide solution. Vail (U.S. Pat. No. 5,057,334, 1991) described the preparation of a cellulose product by treating legume hulls with caustic alkaline oxidizing agent to solubilize the non-cellulose material, then dispersing the resulting pulp in water to form a slurry, lowering the pH of the slurry, then treating the slurry with aqueous hydrogen peroxide. In these efforts, peroxide served to oxidize lignin to low molecular weight organic acids, thereby allowing cellulose to become accessible to the activity of cellulase. The objectives of these methods were to convert renewable lignocellulosic biomass to a form useful for glucose and ethanol production and for use as an energy source in ruminant feeds. To this end, success was achieved in minimizing loss of the hemicellulose fraction during alkaline peroxide extraction of plant sources.

Hemicelluloses are generally defined as polymers that are solubilized from plant cell walls by alkali (Darvill et al. 1980. Pages 91–140, in: *The Biochemistry of Plants*. P. K. Stumpf and E. E. Conn, eds. Academic Press, New York), and those from corn fiber are typically composed of D-xylose (48–54%), L-arabinose (33–35%), galactose (5–11%), and D-glucuronic acid (3–6%) (Whistler and BeMiller (1956) *J. Am. Chem. Soc.* vol. 78, pp. 1163–1165; Sugawara, et al. (1994) *Starch/Staerke*. vol. 46, pp. 335–337; Saulnier, et al. (1995a) *Carbohydr. Polym.* vol. 26, pp. 279–287; Saulnier, et al. (1995b) *Carbohydr. Res.* vol. 272, pp. 241–253). Most of the fraction is soluble in water after alkaline extraction. Their isolation is actually a two-stage process, involving alkaline hydrolysis of ester linkages to liberate them from the lignocellulosic matrix, followed by extraction into aqueous media. It is thus expected that corn fiber gum is cross-linked to other cell wall components for several reasons. Both ferulic acid and p-coumaric acid are esterified to cell wall polysaccharides in various grasses (Mueller-Harvey et al. 1986. *Carbohydr. Res.* vol. 148, pp. 71–85). Partial acid (Yoshida, et al. (1990) *Agric. Biol. Chem.* vol. 54, pp. 1319–1321) and enzymatic (Ohta et al. (1994) *J. Agric. Food Chem.* vol. 42, pp. 653–656) hydrolysis of corn fiber gum yields oligosaccharide fragments in which arabinosyl units are esterified at primary hydroxyl groups with ferulic acid. Some were esterified with diferulic acid (Saulnier, et al. supra) and acetyl esters were also identified on the arabinoxylan (Saulnier, et al. (1995a), supra). In addition, there is evidence to suggest that esterified ferulic and p-coumaric acids serve to couple lignin and polysaccharide (Helm and Ralph (1993) *Carbohydr. Res.* vol. 240, pp. 23–38) and that polyphenolics (including lignin) can form alkali-resistant linkages with the hemicellulose fraction of the matrix polysaccharides (Morrison, I. M. (1974) *Biochem J.* vol. 139, pp. 197–204; Fincher and Stone. (1986) pp. 207–295 In: *Adv. Cereal Sci. Technol.* VIII. Am. Assoc. Cereal Chem.: St. Paul, Minn.). Ether linkages are present in lignin, and there is evidence that ether linkages are also involved in linking lignin to hemicelluloses (Watanabe et al. (1989) *Agric. Biol. Chem.* vol. 53, pp. 2233–2252; Hatfield, R. D. (1991) Pages 285–313 In: *Forage Cell Wall Structure and Digestibility*. Jung et al., eds. ASA-CSSA-SSSA: Madison, Wis.). As a result, most previous preparations of corn fiber gum samples probably contained remnants of lignin, contributing to off-colored products. Protein was also possibly present since stable linkages between hemicellulose and protein in corn bran (Saulnier, et al. (1995a), supra) and rye bran (Ebringerova, et al. (1994) *Carbohydr. Res.* vol. 264, pp. 97–109) have been identified.

Various optimization studies have been conducted to obtain useful high quality corn fiber gum in high yields. In preliminary experiments, corn fiber gum was isolated by standard extraction methods using saturated $Ca(OH)_2$ as extractant at 70° C. for sixteen hours (Rutenberg and Herbst, supra) or under reflux conditions for one hour (Watson and Williams, supra). The 70° C. extractions produced tannish products. Yields ranged from 28.2 to 35.1% for extractions at 70° C. and under reflux conditions, respectively.

At alkaline pHs, solutions of corn fiber gum isolated by the traditional approaches turned intensely yellow, and the color could not be removed by dialysis. This was likely due to the presence of lignins or proteins which were retained even during extraction at elevated temperatures.

Lignin fragments not removed from corn fiber gum with alkali were believed to contaminate corn fiber gum preparations, resulting in the undesirable color. A method was developed for delignifying agricultural residues (Gould, J. M. (1984) *Biotechnol. Bioeng.* vol. 26, pp. 46–52) to maximize their digestibility by ruminant animals. This method incorporated hydrogen peroxide in the extraction medium, which is capable of converting the lignin portion into soluble, low molecular weight organic acids. It was shown (Gould, J. M. 1985b. *Biotechnol. Bioeng.* vol. 27, pp. 225–231) that delignification is most effective at about pH 11.5, the $pK_a$ for the dissociation of hydrogen peroxide, and that the concentration of the species active in delignification, .OH and .$O_2$, are optimal at pH 11.6.

Surprisingly, it has now been discovered that high quality corn fiber gum may be efficiently produced by hydrogen peroxide treatment of unmilled corn fiber during alkaline extraction and/or by hydrogen peroxide treatment after obtaining the alkaline extract of milled corn fiber.

SUMMARY OF THE INVENTION

This invention pertains to a high yield process for producing high quality corn fiber gum by hydrogen peroxide treatment of corn fiber during alkaline extraction and/or after obtaining the alkaline extract of milled corn fiber. This process comprises the steps:

a) mixing corn fiber with an alkaline solution to form a slurry and extract hemicellulose;

b) treating the slurry with hydrogen peroxide at a pH of about 10.0 to 12.5; and c) separating out the insoluble fractions from the corn fiber slurry to yield corn fiber gum.

The corn fiber gum produced by this process is highly soluble in water and provides low viscosity solutions which are nearly devoid of color over a wide pH range. The corn fiber gum lacks objectionable flavor and aroma. The corn fiber gum is useful for a variety of applications, including film formation and to thicken, emulsify, stabilize and/or extend aqueous solutions and suspensions.

In accordance with this discovery, it is an object of the invention to provide a process of preparing corn fiber gum by an alkaline hydrogen peroxide extraction process.

Another object of the present invention is to provide a novel corn fiber gum product prepared by an alkaline hydrogen peroxide extraction process.

These and other objects of the present invention will become apparent to one skilled in the art from the following detailed description and examples below.

DETAILED DESCRIPTION OF THE INVENTION

Figure 1:
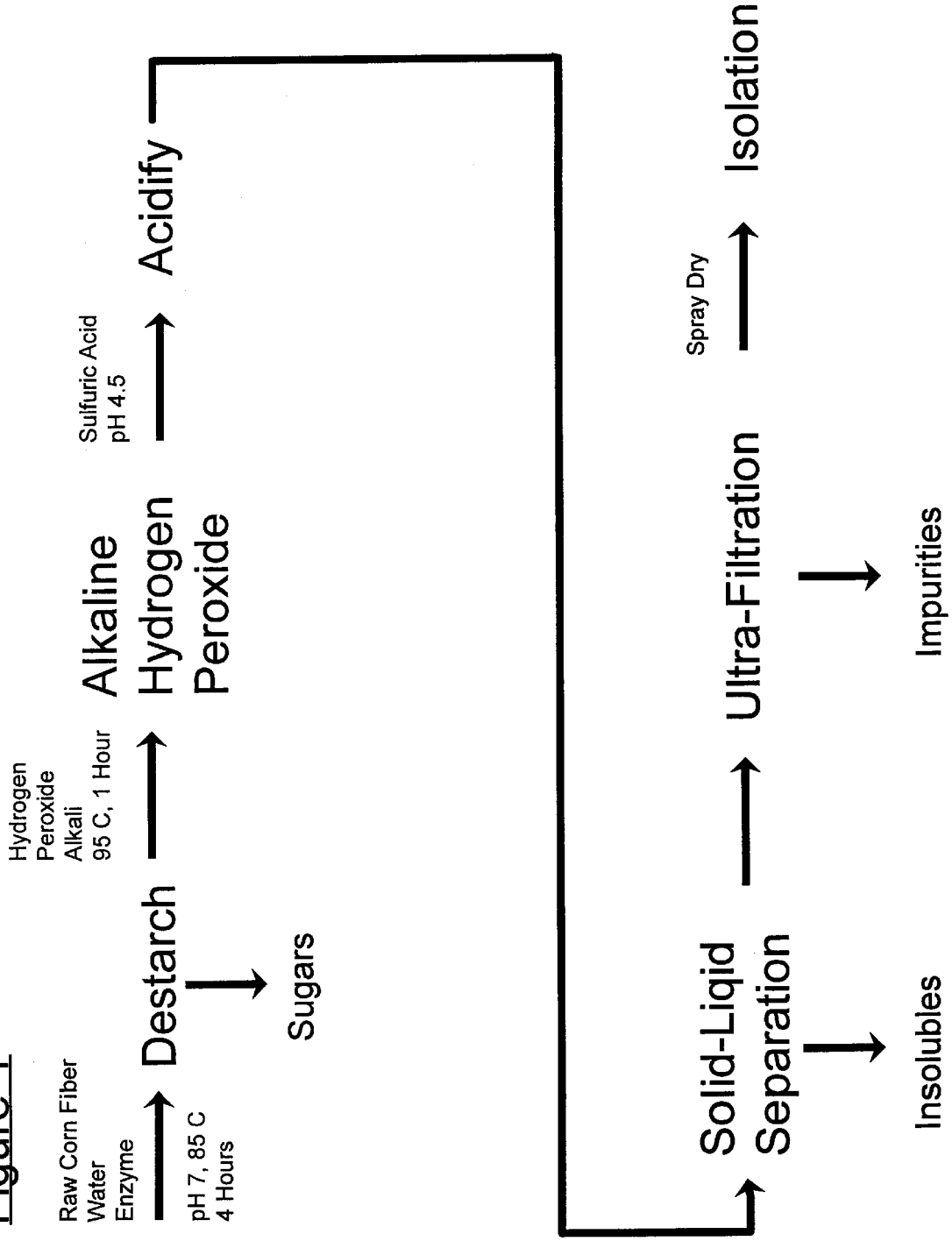
FIG. 1 shows one embodiment of the present alkaline hydrogen peroxide process of extracting corn starch.

This invention pertains to a high yield process for producing high quality corn fiber gum by hydrogen peroxide treatment of corn fiber during alkaline extraction and/or after obtaining the alkaline extract of milled corn fiber. This process comprises the steps:

a) mixing corn fiber with an alkaline solution to form a slurry and extract hemicellulose;

b) treating the slurry with hydrogen peroxide at a pH of about 10.0 to 12.5; and c) separating out the insoluble fractions from the corn fiber slurry to yield corn fiber gum.

Any base corn fiber may be used in the present application, including both those present in native corn and those present in corn produced by standard breeding techniques including crossbreeding, translocation, inversion, transformation or any other method of gene or chromosome engineering to include variations thereof. In addition, corn fiber present from corn grown from artificial mutations and variations of the above generic composition which may be produced by known standard methods of mutation breeding are also suitable herein.

Native corn is intended to mean those varieties found in nature, including dent, waxy, or high amylose corn. As used herein, the term "waxy" is intended to include a starch or flour containing at least about 95% by weight amylopectin and the term "high amylose" is intended to include a starch or flour containing at least about 45% by weight amylose.

The corn fiber may be obtained during a wet-milling or a dry-milling process. The corn fiber may be dried and stored prior to use in the present extraction process, if desired.

Either ground or unground corn fiber samples may be utilized in the extraction process. The corn fiber is fragmented during the hydrogen peroxide treatment, and the residues during and after treatment of both ground and unground fiber appear substantially the same. Apparently sufficient surface area is provided during the early stages of hydrogen peroxide treatment to provide for efficient corn fiber gum extraction. However, when no alkaline hydrogen peroxide step is carried out prior to separation, an increase in yield typically occurs when using ground fiber of at least about 20 mesh rather than unground fiber.

There is no need to wash the corn fiber with either water or organic solvents prior to alkaline peroxide extraction though they may be washed. Unwashed, unground corn fiber samples give comparable yields at a variety of extraction temperatures at pH 11.5 to washed corn fiber.

The corn fiber is optionally destarched, particularly by liquefaction with α-amylase until at least part, particularly substantially all, the starch is soluble. This may be carried out prior to alkaline extraction, or at any point in the process, including after the final corn fiber gum product has been obtained. Destarching prior to any filtration is generally preferred as otherwise the starch may clog the filtration equipment, particularly if the starch has been gelatinized.

If destarched prior to the alkaline hydrogen peroxide treatment, the corn fiber may be separated from the supernatant and rinsed with water to remove the soluble sugars and low molecular weight polysaccharides produced by the starch hydrolysis. This results in a corn fiber gum which is more pure than that produced without removal of the starch hydrolysates.

Destarching may be done using any α-amylase and techniques known in the art. Other methods of destarching known in the art are also suitable, including separation of the starch from the fiber, ie. by a hydrocyclone, or by use of other enzyme(s) or combinations thereof.

Any commercially available α-amylase is suitable for the present invention. The amount of enzyme is dependent upon the enzyme, i.e., source and activity, and base material used as well as the amount of hydrolysis desired. Typically, the enzyme is used in an amount of from about 0 to 20%, particularly from about 0 to 8%, more particularly from about 0.5 to 4% (wt/wt) of the corn fiber. For example, about 4.0% α-amylase (Termamyl commercially available from Novo Nordisk Bioindustrials, Inc.) has been found to be effective in the present invention.

Generally the enzyme treatment is carried out in an aqueous or buffered slurry at a corn fiber solids level of about 5 to about 40%. A solids level of from about 5 to 30% is particularly useful, from about 10 to 23% more particularly useful, in the instant invention.

The pH and temperature of the slurry should be adjusted to provide effective enzyme hydrolysis. These parameters are dependent upon the enzyme to be used and are known in the art. In general, a temperature of above about 75° C. is suitable and the pH is adjusted to about 3.5 to about 8.5, particularly from about 4.5 to about 7.5, using techniques known in the art.

The enzyme reaction is continued until the desired end point (i.e., sufficient degradation for the particular application) has been reached. The end point may be determined by a change in viscosity, by reducing sugar content, or by any other method known in the art for measuring the level of enzyme degradation of the starch molecule. In general, the enzyme reaction will take from about 0.1 to about 24 hours, particularly about 0.5 to about 4 hours. The time of the reaction is dependent upon the corn fiber and enzyme used, the amount of enzyme used, and the reaction parameters of solids percent, pH, and temperature.

The enzyme degradation may be terminated by any method known in the art, particularly acid deactivation or heat deactivation. However, termination of the degradation is not necessary.

Although destarching does not increase the yield or quality of the resulting corn fiber gum preparation, for uses where solution clarity and stability are required, fiber with a low starch content may be particularly suitable. When the starch content of the corn fiber is high, some residual starch may be found in the corn fiber gum extracts. Further, depending upon the separation technique(s) used, the presence of starch in the corn fiber may impede separation of the solids from the corn fiber gum.

The corn fiber, whether or not destarched, is delignified by treatment with an alkaline hydrogen peroxide solution to extract hemicellulose from the fiber matrix. Further, treatment with an alkaline hydrogen peroxide solution may degrade colored impurities, resulting in a lighter colored corn fiber gum.

If the corn fiber is in the dry form, it is first slurried in water, particularly from about 10 to 20% solids. Sufficient water must be present to allow substantially uniform exposure to the alkaline hydrogen peroxide, but the addition of excess water may be detrimental to efficiency as more corn fiber gum solution would need to be separated from the solids, and if a dried corn fiber gum product was desired, more water would need to be evaporated.

The slurry is then basified by adding sodium hydroxide, potassium hydroxide, calcium hydroxide, and/or magnesium hydroxide in an amount necessary to bring the pH of the slurry to the range of from about 10.0 to 12.5. To obtain greater yields, a pH of from about 11.2 to 11.8 is particularly suitable, more particularly from about 11.4 to 11.6, most particularly at about 11.5. In the alternative, the corn fiber may be slurried into such an alkaline solution.

However, higher pH tends to result in a final corn fiber gum product that is less white in color. Therefore, a slightly lower pH may be desirable for certain applications so that the yield is slightly lower than optimal, but the color is lighter.

Hydrogen peroxide may be either added with the base or after the slurry has been basified. The hydrogen peroxide is added in an amount of from about 5 to 20% (wt/wt) based on the corn fiber.

The temperature may then be raised, particularly to at least about 60° C., more particularly to about the boiling point for at least about half an hour, particularly for at least about one hour, though longer times may be used. In general, the time will be dependent upon the temperature of extraction, the pH, and the amount of hydrogen peroxide.

Figure 2:
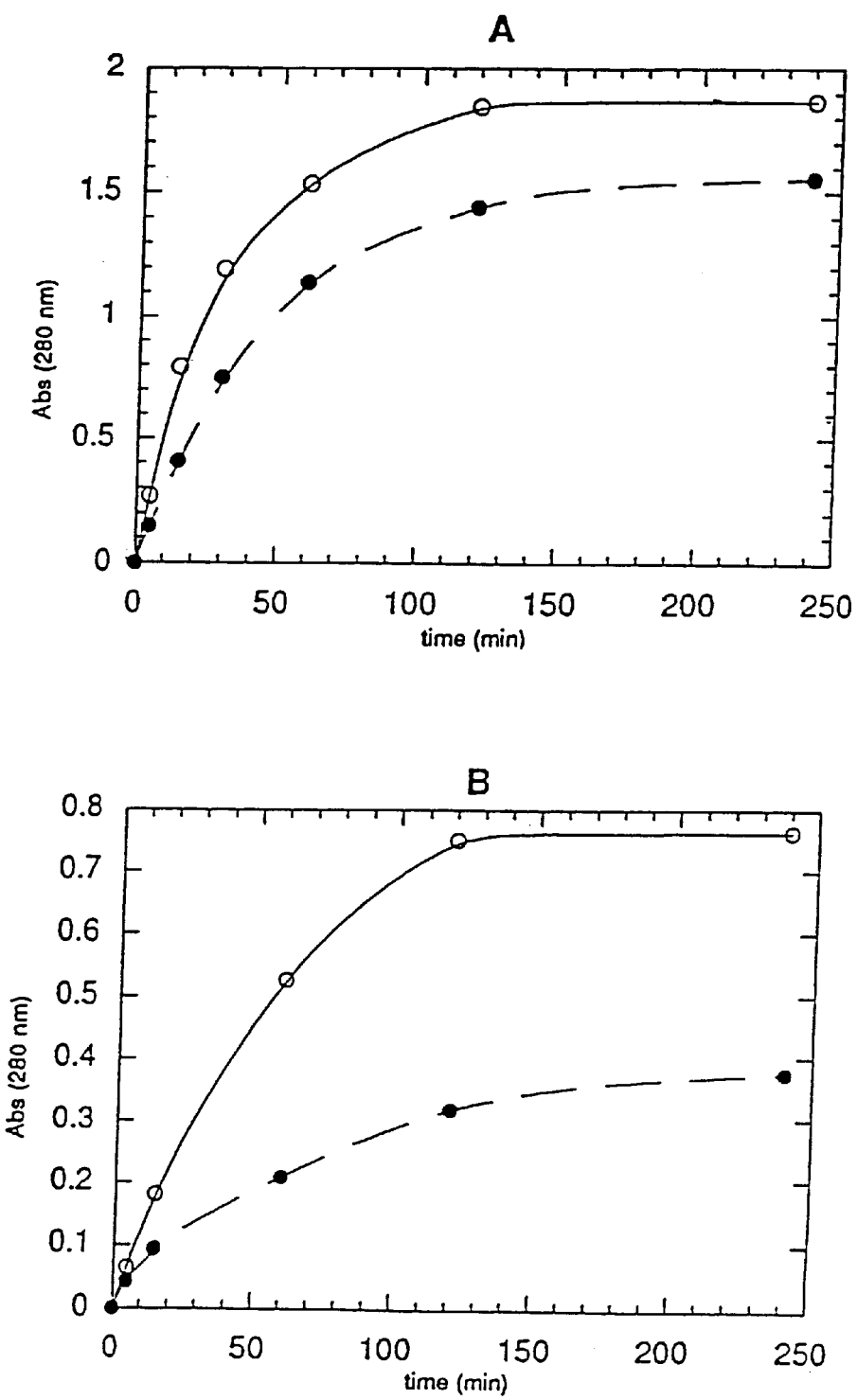
FIG. 2A shows the effect of temperature on delignification of washed corn fiber at 25° C. (●) and at 60° C. (○), with an $H_2O_2$ to fiber ratio of 0.15.; 2B shows the effect of $H_2O_2$ to fiber ratios of 0.0625 (●) and 0.25 (○) on delignification of washed corn fiber at 60° C. Conditions: pH 11.5, liquid-to-fiber ratio, 15:1 (v/w).
Figure 3:
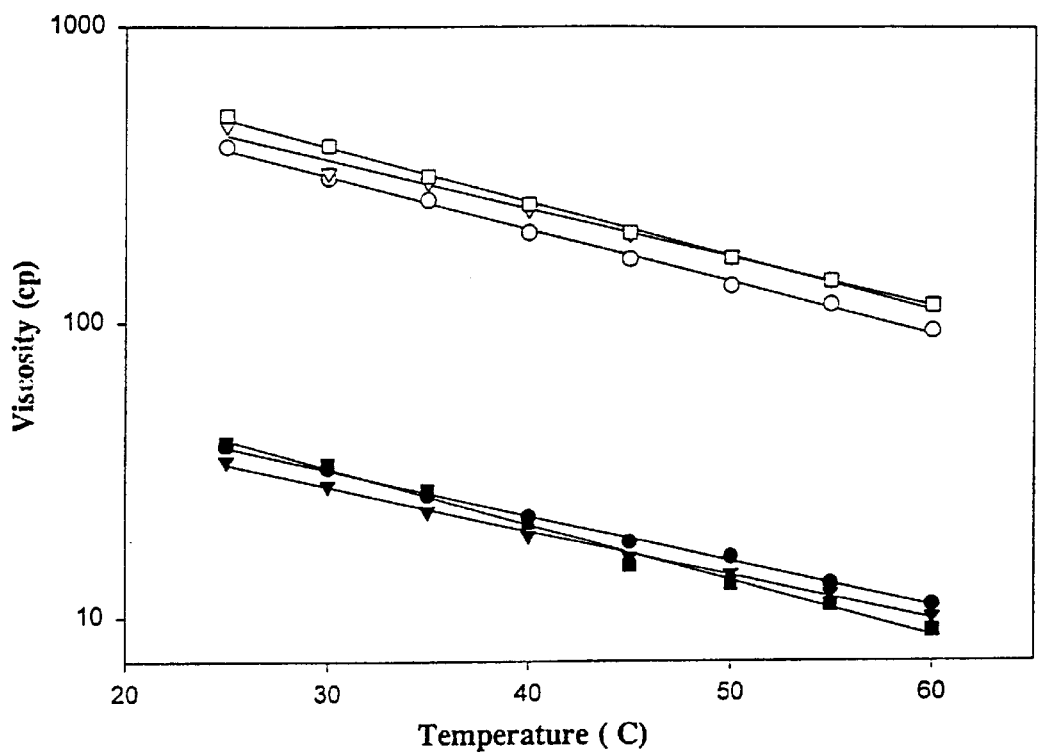
FIG. 3 shows the viscosity with temperature of corn fiber gum solutions (5 and 10% (wt/wt) solids) at pH 5.5: water at 5% (●), water at 10% (○), 100 mM NaCl at 5% (▼), 100 mM NaCl at 10% (◄), 100 mM $CaCl_2$ at 5% (■), and 100 mM $CaCl_2$ at 10% ( ).

The amount of lignin degradation with alkaline peroxide may be monitored by any technique known in the art, such as the increase in optical density at 280 nm. Lignin removal is generally maximized in about four hours at both about 25° C. and at about 60° C., but about a 20% higher level of delignification products were produced at the higher temperatures (FIG. 2A). The effect of hydrogen peroxide level on delignification is shown in FIG. 2B. In general, increasing the ratio of hydrogen peroxide:fiber increases the level of delignification. The results of alkaline peroxide extractions of corn fiber gum under different conditions are shown in Table I, Example 8.

The hemicellulose A is optionally separated from the corn fiber gum fraction. Hemicellulose A is the insoluble fraction of the hemicellulose while hemicellulose B (corn fiber gum) is the soluble fraction. However, hemicellulose A is soluble under alkaline conditions and is only insoluble under acidic conditions. The hemicellulose A therefore is typically removed by acidifying the corn fiber slurry to a pH of about 3.5 to 6.0, particularly from about 4.0 to 5.0. Any acid or combination, either mineral or organic, capable of lowering the slurry acidity to this range is suitable, particularly sulfuric, hydrochloric, phosphoric, acetic, or propionic acid. Sulfuric acid is more particularly suitable as it generally produces a light colored corn fiber gum. Carbon dioxide gas is also suitable for acidification in the present process. The only limitation is that the acid used is acceptable for the end use application.

The hemicellulose A yield by this process (on a dry, starch-free basis), generally is exceeded by that of the soluble corn fiber gum by more than ten-fold. For example, extraction at 60° C. results in a yield of hemicellulose A that is about 8% (wt/wt) of that of corn fiber gum (hemicellulose B).

Hemicellulose A is water-insoluble. Determination of its removal depends upon the end use application. For example, if the application needs complete solubility, such as in a beverage product, then it is important that hemicellulose A be removed using techniques known in the art, such as filtration. If the hemicellulose A is not removed, resulting solutions may be turbid or even may contain a precipitate, thus limiting the product usefulness. However, if the end use application does not require such stringent standards, the hemicellulose A does not need to be precipitated and separated from the corn fiber gum, for example in a cement mix or in certain cosmetic products. Further, if the end use application is alkaline in nature, it is unnecessary to precipitate and separate the hemicellulose A from the corn fiber gum as it may remain soluble.

The solids are then separated from the solution containing the soluble corn fiber gum. The slurry may optionally be heated prior to separation to facilitate flow. The separation of the solids may be accomplished by a variety of techniques known in the art and is dependent upon the liquid:solid ratio, the particle size of the corn fiber, the presence or absence of starch, the pH and temperature of the slurry during separation, and the degree of purity desired. Further, more than one separation may be preferred, particularly from an efficiency standpoint. Typical separation processes include, but are not limited to filtration such as gravimetric, filter press, horizontal plate, tubular, and vacuum filtration; centrifugation such as horizontal decanter and high speed disc centrifugation; microfiltration and ultrafiltration.

After separation of the solids, a second alkaline hydrogen peroxide treatment may be conducted. Such additional alkaline hydrogen peroxide treatment is carried out in the same manner as the first such treatment, but is generally carried out for a longer period of time, particularly at least about two hours. This second alkaline hydrogen peroxide treatment further decomposes impurities and results in a lighter colored corn fiber gum.

If such second alkaline hydrogen peroxide treatment is carried out, the "solution" is typically separated a second time using any method known in the art, but generally one that will separate out undesirable fractions, such as salts, ash and other by-products of the hydrogen peroxide treatment. For example, the second separation may be accomplished by ultrafiltration or microfiltration. This second separation results in a purer product and is particularly desired when the corn fiber gum is to be used for food or pharmaceutical applications.

The pH of the slurry may be adjusted prior to any separation step. Generally, the pH is adjusted if necessary to prevent degradation of the corn fiber gum and/or for safety reasons. The only situation in which the pH should not be adjusted prior to the separation is when separation is used to remove any precipitated hemicellulose A from the slurry, as adjusting the pH out of the acidic range will allow the hemicellulose A to go back into solution.

The resultant corn fiber gum may be used directly in liquid form. Alternatively, the corn fiber gum may be recovered in powdered form by conventional techniques known in the art, including drum drying, freeze drying, and spray drying.

The corn fiber gum may alternatively be precipitated from solution using lower alcohol extraction techniques. Lower alcohol is intended to mean a $C_{1-3}$ alcohol, particularly ethanol or isopropanol, more particularly ethanol. Alcohol precipitation of corn fiber gum is known in the art and is particularly useful when a high degree of purity is desired, such as for pharmaceutical applications. Further, alcohol precipitation usually results in a lighter colored, purer product than many other separation techniques, ie. spray drying, as less impurities remain in the product.

For example, about two volumes of ethanol are added to the corn fiber gum solution. The solution is then allowed to stand until the corn fiber gum settles out as a white flocculent precipitate. The alcohol/water mixture is then removed using techniques known in the art such as decantation and filtration. The alcohol extraction may be repeated one or more times. The resulting corn fiber gum may then be dried, such as by air, oven, vacuum, fluid bed, freeze, or rotary drying. After the corn fiber gum is recovered, it may be ground to a smaller and/or more uniform particle size if desired using techniques known in the art.

The corn fiber gum may also be modified using techniques known in the art such as crosslinking, derivatization, hydrolysis, and thermal inhibition. If desired, the corn fiber gum may be further purified using methods known in the art such as microfiltration, ultrafiltration, reverse osmosis, bleaching/oxidizing, ion exchange, steam stripping, and carbon column filtration.

The purity and yield of the resultant corn fiber gum will vary depending upon the process steps used and their order. In general, a yield of from about 25 to about 50%, particularly from about 35 to 50% (wt/wt) may be achieved based upon the destarched corn fiber.

The resultant corn fiber gum ranges in color from a very light beige to white, depending primarily on the amount of purities which have been removed. It is highly soluble in water and provides low viscosity solutions which are nearly devoid of color over a wide pH range. The corn fiber gum lacks objectionable flavor and aroma. It is stable at least in the temperature range of 25 to 60° C. in both water and in salt solutions (sodium or calcium chloride). The resultant corn fiber gum also has excellent water holding capabilities. Such property is desirable for numerous applications including adhesives and cement. It is also stable over a wide pH range.

The resultant corn fiber gum is useful in the same applications as previously known corn fiber gums, including for film formation and to thicken, emulsify, stabilize and/or extend aqueous solutions and suspensions. Specifically, corn fiber gum is useful in food products, pharmaceuticals, cosmetics and personal health products, cement, and adhesives. The corn fiber gum may also be used as a rheological modifier such as in paints, coatings, and films.

The general process, above, for producing corn fiber gum may be done using several alternative orders, each producing different yields and/or purities of corn fiber gum. For example, the corn fiber may be basified, the solids may be separated out, and then the alkaline hydrogen peroxide treatment may be carried out. The critical element of the process is carrying out the hydrogen peroxide treatment at alkaline pH. In general, the remainder of the steps can be carried out by those of skill in the art by following routine procedures or the description contained herein. Determination of the process steps and conditions to be used is dependent upon the desired properties of the corn fiber gum.

The following examples are intended only to further illustrate the invention and are not intended to limit the scope of the invention as defined by the claims.

EXAMPLES

Example 1

Process of Extracting Corn Fiber Gum

Destarching a. Corn fiber (3500 g anhydrous) was added to 70 liters of water and mixed well. The pH was adjusted to 7.0 with 25% NaOH. The slurry was heated to 85° C. and the pH was readjusted to 7.0. 140 g of Termamyl 120 L (commercially available from Novo Nordisk Bioindustrials, Inc., Danbury, Conn.). The temperature was held at 85° C. with mixing for four hours. The slurry was cooled to room temperature and dewatered using a perforated bowl centrifuge. The corn fiber was washed with water two times on the bowl.

b. The destarching of Example 1a was repeated and the corn fiber was dried after being washed.

Alkaline Hydrogen Peroxide Treatment

The destarched corn fiber (3000 g anhydrous) was added to 60 liters of water with mixing. 240 g of sodium hydroxide pellets and 222 g of calcium hydroxide were added to the mixture. 1000 g of hydrogen peroxide (30% solution) was then slowly added. The mixture was heated to 95° C. and held for one hour with mixing. The mixture was acidified to pH 4.5 with 25% sulfuric acid and cooled to room temperature.

Separation a. The insoluble material was separated using a Sharples P-660 horizontal decanter centrifuge, followed by a BTPX 205 high speed disk centrifuge (both commercially available from Alfa Laval, Inc., Warminster, Pa.).

b. The insoluble material was separated out as in Example 1a separation and the centrate was further clarified using an ultrafiltration membrane with 300,000 molecular weight cutoff.

Isolation a. The centrate was concentrated to between 10 and 15% solids, if necessary, and then spray dried using an Ahydro Lab #1 spray drier (commercially available from Anhydro Lab, Attleboro Falls Mass.) with an inlet temperature of 250° C. and an outlet temperature of 85–95° C. The pH was kept in the range of 5 to 9.

b. Two volumes of 95% ethanol were added to rapidly stirred centrate. After allowing the corn fiber gum to settle out as a white flocculant precipitate (about 10 min), the alcohol/water mixture was removed by decantation. The precipitate was removed by filtration, air-dried in a fume hood and then in vacuum over at 50° C. for one hour. The resultant corn fiber gum was a fine white powder.

Example 2

Process of Extracting Corn Fiber Gum Using a Second Alkaline Hydrogen Peroxide Treatment Destarching The corn fiber was destarched using the destarching procedure of Example 1.

Alkaline Hydrogen Peroxide Treatment

The corn fiber was treated with alkaline hydrogen peroxide using the alkaline hydrogen peroxide procedure of Example 1.

Separation

The insoluble material was separated using the separation procedure of Example 1.

Second Alkaline Hydrogen Peroxide Treatment 1000 g of hydrogen peroxide (30% solution) were added to the centrate obtained from the solid-liquid separation. The pH of the mixture was adjusted to 11.5 with 25% sodium hydroxide and agitated for two hours. The mixture was neutralized to pH 7.0 with 25% sulfuric acid and then ultrafiltrated to further clarify the centrate.

Isolation

Corn fiber gum was isolated using the isolation procedure of Example 1.

Example 3

Process of Extracting Corn Fiber Gum Using Alkaline Hydrogen Peroxide Treatment After Separation Destarching The corn fiber was destarched using the destarching procedure of Example 1.

Alkaline Extraction

The destarched corn fiber (3000 g anhydrous) was added to 60 liters of water with mixing. 240 g of sodium hydroxide pellets and 222 g of calcium hydroxide were added to the mixture. The mixture was heated to 95° C. and held for one hour with mixing. The mixture was acidified to pH 4.5 with 25% sulfuric acid and cooled to room temperature.

Separation

The insoluble material was separated using the separation procedure of Example 1.

Alkaline Hydrogen Peroxide Treatment 1000 g of hydrogen peroxide (30% solution) were added to the centrate obtained from the above solid-liquid separation. The pH of the mixture was adjusted to 11.5 with 25% sodium hydroxide and agitated for two hours. The mixture was neutralized to pH 7.0 with 25% sulfuric acid.

Second Separation a. The mixture was ultrafiltrated to further clarify the centrate using the separation procedure of Example 1b.

b. No separation was done.

Isolation

The corn fiber gum was isolated using the isolation procedure of Example 1.

Example 4

Process of Extracting Corn Fiber Gum Using a Second Separation Step

Destarching

The corn fiber was destarched using the destarching procedure of Example 1.

Alkaline Extraction

The destarched corn fiber (3000 g anhydrous) was added to 60 liters of water with mixing. 240 g of sodium hydroxide pellets and 222 g of calcium hydroxide were added to the mixture. The mixture was heated to 95° C. and held for one hour with mixing. The mixture was cooled to room temperature.

Separation

The insoluble mixture was separated using the separation procedure of Example 1a.

Alkaline Hydrogen Peroxide Treatment 1000 g of hydrogen peroxide (30% solution) were added to the centrate obtained from the above solid-liquid separation. The pH of the mixture was adjusted to 11.5 with 25% sodium hydroxide and agitated for two hours. The slurry was then acidified to a pH 4.5 with 25% sulfuric acid.

Separation

The insoluble material is separated out using the separation procedure of Example 1b.

Isolation

The corn fiber gum is recovered using the isolation procedure of Example 1.

Example 5

Process of Extracting Corn Fiber Gum Using Carbon Dioxide to Acidify

Destarching

The corn fiber is destarched using the destarching procedure of Example 1.

Alkaline Hydrogen Peroxide Treatment a. The destarched corn fiber (3000 g anhydrous) was added to 60 liters of water with mixing. 240 g of sodium hydroxide pellets and 222 g of calcium hydroxide were added to the mixture. 1000 g of hydrogen peroxide (30% solution) were then slowly added. The mixture was heated to 95° C. and held for one hour with mixing. The mixture was acidified to pH 4.5 with carbon dioxide gas and cooled to room temperature.

b. The procedure of 5a was followed, except that dry ice is used as the source of carbon dioxide.

Separation

The insoluble material was separated using the separation procedure of Example 1.

Isolation

The corn fiber gum was isolated using the isolation procedure of Example 1.

Example 6

Comparison of Yields Using the Various Processes of Extracting Corn Fiber Gum The percent (wt/wt) yield of corn fiber gum resulting from the above processes were determined based on the destarched corn fiber.

| Sample | Percent Yield (wt/wt) |
|---|---|
| Example 1 | 42.7 |
| Example 3 | 32.7 |

Example 7
Variation on Process of Extracting Corn Fiber Gum Using a Second Separation Step
Destarching Corn fiber samples were ground to a particle size of 20 mesh using a Wiley mill. Moisture levels were determined after drying the samples to a constant weight in a vacuum oven at 80° C. Starch was removed from the ground fiber by sedimentation followed by treatment with the α-amylase, Termamyl (commercially available from Novo Nordisk Bioindustrials, Inc., Danbury, Conn.). Corn fiber (770 g, 20 mesh) was stirred in a cylinder with seven liters water and the mixture was then allowed to settle. The starch granules were concentrated in the upper portion of the sediment, and they were removed by decantation. After repeating this process four times, the fiber/water sediment was diluted to five liters with water. This mixture was stirred at 95° C. for two hours at pH 6.5 with 50 ml α-amylase, in order to liquefy residual starch. The residue was collected by filtration, washed with distilled, deionized water (five liters) in order to remove any remaining maltodextrins, and dried in a vacuum oven at 50° C.

Alkaline Extraction a. Ground corn fiber (100 g) was mechanically stirred at 85–90° C. into one liter of water. Sodium hydroxide (8 g) were added so that a total of 2 meq alkali/g fiber were present in the extraction medium. The mixture was boiled with mechanical stirring for one hour.

b. Example 7a was repeated using 7.4 grams calcium hydroxide in place of the sodium hydroxide.

Separation

Residue was removed by centrifugation (6,000× g for about 10 min), and the corn fiber gum-containing supernatant was removed by decantation (about 660 ml). The remaining fluid (about 340 ml) remained associated with residue and contained about one-third of the extracted hemicellulose. Additional corn fiber gum was recovered by adding 800 ml water to the residue and boiling the mixture for five minutes with stirring. This mixture was then centrifuged and the supernatant combined with that of the original extract. The total volume of extracts was about 1.4 liters. This procedure was repeated in order to isolate additional corn fiber gum.

Alkaline Hydrogen Peroxide Treatment

To the extract of 100 g fiber was added 10 g hydrogen peroxide (33.3 ml of 30% $H_2O_2$). After adjusting the pH to 11.5 by addition of 50% NaOH, the solution was stirred at ambient temperature for two hours.

Separation a. The $H_2O_2$-treated alkaline extract was adjusted to pH 4 to 4.5 by addition of HCl (concentrated, about 37%). After 15 minutes, the hemicellulose A precipitate was removed by vacuum filtration through Celite filter aid.

b. The above separation was repeated using centrifugation at 10,000× g for 10 minutes.

Isolation

Two volumes of 95% ethanol were gradually added to the filtrate. After allowing the corn fiber gum to settle out as a white flocculant precipitate (about 10 min), the alcohol/water mixture was removed by decantation. The precipitate was stirred in 95% ethanol for five minutes, removed by filtration, air-dried in a fume hood and then in vacuum over at 50° C. for one hour. The corn fiber gum recovered was then converted to a fine white powder with a conventional chopper-grinder.

Example 8
Comparison of Hemicellulose Yields Extracted Under Different Conditions Corn fiber (3.0 g; 20 mesh destarched, unground not destarched) and aqueous 30% hydrogen peroxide (2.5 ml) were added to rapidly stirred water (75 ml, deionized and distilled), to give a 0.25 ratio of hydrogen peroxide to fiber, and a 1% aqueous solution of $H_2O_2$. The pH was adjusted to 11.5 by addition of 2N NaOH (9 ml). Under these conditions, there were about 15 meq NaOH per gram of fiber. Reactions at 25° C. were conducted in Erlenmeyer flasks on magnetic stirrers, while those at 60° C. were conducted in a jacketed reaction vessel heated with water from a thermostat-controlled circulating bath. During initial stages of stirring, oxygen evolution was active, and substantial frothing occurred, requiring that extractions be conducted in vessels with volumes two to three times those of extraction mixtures. The pH during extractions were maintained at 11.4 to 11.6 by dropwise addition of 50% NaOH. After removing residue by centrifugation at 3,000× g for 10 min, the supernatant fluid was adjusted to pH 4.0 with 4N HCl (about 2 ml). The hemicellulose A fraction was allowed to precipitate overnight, and then collected after centrifugation at 10,000× g for 10 min. The supernatant fluid containing corn fiber gum was removed by decantation. The hemicellulose A precipitate was washed with isopropanol, collected by filtration, and then dried in a vacuum oven at 50° C. Corn fiber gum was precipitated by pouring the supernatant fluid into two volumes of stirred isopropanol, from which it settled out as a white flocculant precipitate. Corn fiber gum was collected after carefully decanting off the supernatant fluid. It was transferred with the aid of isopropanol to a beaker, and the mixture was stirred for 5 min. This converted the material from a sticky and rubbery state to a more workable form. Next the corn fiber gum fraction was collected (filtration, centrifugation, or sieve), and air-dried in a fume hood for one hour, finely fragmented with a conventional chopper-grinder, and dried to constant weight in a vacuum oven at 50° C.

The yields of the corn fiber gum are shown in Table I, below.

TABLE I

Yields of Hemicellulose A and B from Alkaline $H_2O_2$ Extraction of Corn Fiber[a]

| | REACTION CONDITIONS | | | HEMICELLULOSE | |
| | | Temp., | | YIELD, %[b] | |
| Trial | Corn Fiber | Initial pH | ° C. | Time, hr | B | A |
|---|---|---|---|---|---|---|
| A | 20 Mesh | 11.5 | 25 | 8 | 15 | 3.1 |
| B | 20 Mesh | 11.5 | 25 | 24 | 35 | 3.5 |
| C | 20 Mesh | 11.5 | 25 | 72 | 36 | — |
| D | 20 Mesh | 11.5 | 60 | 2 | 41 | 2.8 |
| E | 20 Mesh | 12.0 | 25 | 8 | 35 | 4.2 |
| F | 20 Mesh | 12.0 | 25 | 24 | 40 | 3.7 |
| G | 20 Mesh | 12.0 | 60 | 2 | 32 | 8.3 |
| H | 20 Mesh | 11.5–12.5[c] | 60 | 2 | 51 | 4.2 |

TABLE I-continued

Yields of Hemicellulose A and B from
Alkaline H$_2$O$_2$ Extraction of Corn Fiber[a]

| | | REACTION CONDITIONS | | | HEMICELLULOSE YIELD, %[b] | |
|---|---|---|---|---|---|---|
| Trial | Corn Fiber | Initial pH | Temp., °C. | Time, hr | B | A |
| I | Unground | 11.5 | 25 | 24 | 35 | 0.4 |
| J | Unground | 11.5 | 25 | 72 | 38 | — |
| K | Unground | 11.5 | 60 | 2 | 42 | 1.7 |
| L | Unground | 11.5–12.5[c] | 60 | 2 | 47 | 8.5 |
| M | Unground | 11.5–12.5[c] | 25 | 24 | 46 | 4.2 |

[a]Extractions were conducted using fiber-alkaline solution-H$_2$O$_2$ ratios of 1:25:0.25 (w/v/w); 20 mesh fiber samples were destarched, and the unground fiber samples were unwashed.
[b]Yields for all trials are reported on a dry, starch-free basis.
[c]Initial pH of 11.5 was increased to 12.5 after half extraction time had elapsed.

Application of the alkaline hydrogen peroxide process to 20 mesh fiber at 25° C. indicated a doubling of corn fiber gum yield between an 8 and 24 hour (rows A,B) extraction period. An extraction in which the proportion of hydrogen peroxide to fiber was increased from 0.25 to 0.50 resulted in an increase in the yield of corn fiber gum after 72 hours at 25° C. from 36% (row C) to 46%. The corn fiber gum was nearly white, and the recovered residue was off-white. In 8 hours, 25° C. extractions, the yield more than doubled when the pH was increased from 11.5 to 12.0 (rows A,E). In 24 hours at 25° C., only a modest gain in yield was achieved by increasing the pH from 11.5 to 12.0 (rows B,F). At 60° C., a higher yield of corn fiber gum was obtained at pH 11.5 than at pH 12.0 (rows D,G). This is the trend that would be expected, since pH 11.5 is the optimal pH for lignin oxidation. At 60° C. and pH 12.0, 26% of the corn fiber gum was hemicellulose A (row G). A maximum corn fiber gum yield of 51% was obtained at 60° C. by processing at pH 11.5 for the first hour and then increasing the pH to 12.5 for the final hour (row H). When using unground corn fiber, as with 20-mesh fiber, little gain in yield resulted from extending the 25° C. process beyond 24 hours (rows I,J). By comparing results using ground and unground fiber, it is clear that the energy intensive grinding step provides little advantage in terms of corn fiber gum yield (rows B,I, C,J, D,K, F,M, and H,L).

Corn fiber gum yields were reduced by more than one-third when extractions were conducted in the absence of hydrogen peroxide. Using conditions such as Trial D (Table I), for example, the yield dropped from 41 to 25%. When color as well as yield is considered, the process is most effective when conducted at pH 11.5. Possibly at the elevated pH, especially at 60° C., chromophores are generated by alkali-catalyzed modification of reducing end groups on the polysaccharide. The corn fiber gums generated at pH 11.5 were off-white, while those exposed to pH values of 12.0 and 12.5 were tannish, even when the extractions were done at room temperature. A two hour reaction period at pH 11.5 and 60° C. with unground fiber (row K) gave a 42% yield of off-white corn fiber gum, with a very low level (1.7%) of hemicellulose A. Kernel pericarp, when extracted under these conditions, yielded off-white corn fiber gum in a 24% yield.

The results in Table I were from experiments using solutions with a ratio of fiber to alkali to hydrogen peroxide of 1:25:0.25. Under these conditions, most of the fluid (and corn fiber gum) was isolated after removal of residue by centrifugation. When solutions with higher ratios of fiber to alkali were used, however, significant quantities of fluid and associated corn fiber gum remain with the swelled residue. Then it is necessary to redisperse the residue in additional water to extract residual corn fiber gum. When extractions are conducted at fiber to liquid ratios of 1:10, substantial amounts of corn fiber gum-containing fluid remained associated with the residue, since it became very swollen and absorbent. Only about 70% of the fluid is isolated after the initial centrifugation and decantation, so as much as 30% of product could remain in the fluid associated with the residue.

When the isolated corn fiber gum preparations were taken up in alkaline peroxide at pH 11.5, no additional 280 nm absorbing material was generated, indicating that all lignin susceptible to degradation had been removed.

Example 9

Compositions and Properties of Corn Fiber Gum Extracted Using Different Alkaline Solutions Corn fiber was ground to a 20 mesh using a Wiley mill. 500 g of the corn fiber were stirred in four liters water and the pH was adjusted to 6.5 by addition of a 50% solution of sodium hydroxide at 85–90° C. 20 ml α-amylase (Termamyl) were added and allowed to treat for four hours. The corn fiber was then separated out by centrifugation and decantation. The fiber was washed with water, then ethanol and dried in a 60° C. oven.

100 g of the destarched corn fiber was stirred into one liter water and 2 meq alkali/g fiber were added (NaOH; Ca(OH)$_2$; or 1:1 (equimolar) mixture). The mixture was boiled for one hour. The residue was removed by centrifugation and the supernatant was removed by decantation. 800 ml water were added to the residue and the mixture was boiled for five minutes with mixing. The mixture was then centrifuged and the centrate was combined with the supernatant to produce 1.4 liters.

10 g hydrogen peroxide (33.3 ml of aqueous 30% hydrogen peroxide) were added with stirring, the pH was adjusted to 11.5 by addition of 50% sodium hydroxide, and the reaction was allowed to proceed for two hours.

The treated extract was adjusted to pH of 4.0 to 4.5 by addition of concentrated hydrochloric acid. After 15 to 30 minutes, the hemicellulose A precipitate was removed by filtration through Celite. Two volumes of 95% ethanol was stirred into the filtrate and the corn fiber gum was allowed to settle out as a white flocculant precipitate (10 minutes). Corn fiber gum was collected after carefully decanting off the supernatant fluid. The precipitate was stirred in 95% ethanol for five minutes, isolated by filtration, air dried, and then dried in a vacuum oven at 50° C. for one hour. The corn fiber gum product was finely fragmented with a conventional chopper-grinder, and dried to constant weight in a vacuum oven at 50° C. The resulting corn fiber gum was analyzed using methods known in the art and the percent yield (wt/wt) was determined based on the destarched corn fiber. The results are shown in Table II, below.

TABLE II

| | NaOH only | NaOH:Ca(OH)$_2$ = 1:1 | Ca(OH)$_2$ only |
|---|---|---|---|
| percent yield[a] | 40 | 27 | 21 |
| ash (%) | 2.15 | 2.42 | 2.65 |
| N (%) | 0.151 | 0.183 | 0.135 |
| Ca (%) | 0.30 | 0.63 | 0.56 |
| MW (kDa)[b] | 3.94(0.04) | 3.03(0.10) | 2.78(0.05) |
| Wi[c] | 38.9 | 49.4 | 50.3 |
| Arabinose[d] | 39.4 | 40.8 | 37.7 |
| Xylose[d] | 48.1 | 49.5 | 49.8 |
| Galactose[d] | 8.4 | 5.4 | 7.5 |

TABLE II-continued

|  | NaOH only | NaOH:Ca(OH)$_2$ = 1:1 | Ca(OH)$_2$ only |
|---|---|---|---|
| Glucuronic Acid[d] | 4.2 | 4.3 | 4.9 |
| Glucose[d] | 0.8 | 0.8 | 1.0 |

[a]on a dry weight basis; starting corn fiber was 5.8% moisture
[b]weight average molecular weight (standard deviation of triplicate determinations) using high performance size exclusion chromatography with multiangular laser light scattering and differential refractive index detectors
[c]whiteness index for standard = 83.2 using a Hunter Lab Miniscan XE color analyzer
[d]relative percentages of sugar composition as determined by GLC after acid hydrolysis The effect of hydrogen peroxide on the color approached its minimum at about 90 minutes. Yields of the corn fiber gum correlate with the pH of the extraction medium as in all cases the total alkali to fiber ratio was 2 meq/g. The pH using calcium hydroxide was 9.8, using sodium hydroxide 11.1, and using eqimolar ratios of the two 10.3. The nitrogen levels of the corn fiber gum were less than 0.2%, significantly lower than that of the starting material, 1.63%. The calcium and sodium levels reflect the type of base used for extraction.

The high arabinose/xylose ratios attest to the very high degree of branching on the β-(1→4)-D-xylopyranose backbone. Lower levels of galactose and glucuronic acid were present. There appears to be no significant difference in sugar levels between corn fiber gum samples extracted using different bases. Sugar levels do not appear to differ significantly from that obtained using the process without hydrogen peroxide, indicating hydrogen peroxide has no effect on the monomer composition of the arabinoxylan polysaccharide. The low glucose levels most likely indicates the presence of trace quantities of residual starch; the bulk being removed with the insoluble hemicellulose A fraction.

The molecular weight (MW) values correlate with yield and pH of extraction medium. It appears that the more extreme conditions of the sodium hydroxide extraction resulted in liberation of a higher molecular weight fraction of corn fiber gum. The corn fiber gum of lowest molecular weight, isolated using the milder conditions of calcium hydroxide extraction, was the most white in color.

Other embodiments of the present invention include:
1. A method for the preparation of hemicellulose B, said method comprising
    a) treating corn fiber with a-amylase for a time sufficient for starch to be removed from the corn fiber;
    b) mixing treated corn fiber with an alkaline solution to extract hemicellulose;
    c) treating the extracted hemicellulose with H$_2$O$_2$ at a pH of about 11.2 to about 11.8;
    d) separating hemicellulose A from hemicellulose B; and
    e) drying hemicellulose B and pulverizing said hemicellulose to a powder.
2. A method for the preparation of hemicellulose B, said method comprising
    a) treating corn fiber with a-amylase for a time sufficient for starch to be removed from the corn fiber;
    b) mixing treated corn fiber with an alkaline peroxide solution at a pH of about 11.2 to about 11.8 to extract hemicellulose;
    c) separating hemicellulose A from hemicellulose B; and
    d) drying hemicellulose B and pulverizing said hemicellulose to a powder.
3. The method of 1 or 2, wherein step a) is carried out in the presence of Ca$^{2+}$.
4. The method of 3, wherein step a) is carried out at a pH of about 6.6 to about 7.0.
5. The method of 4, wherein step a) is carried out at a pH of about 6.8.
6. The method of 5, wherein step a) is carried out at a temperature of about 80° C.
7. The method of 1, wherein said alkaline solution comprises NaOH at a pH of about 11.2 to about 11.8.
8. The method of 7, wherein said alkaline solution comprises NaOH at a pH of about 11.4 to about 11.6.
9. The method of 8, wherein said alkaline solution comprises NaOH at a pH of about 11.5.
10. The method of 2, wherein said alkaline peroxide solution comprises NaOH and H$_2$O$_2$ at a pH of about 11.2 to about 11.8.
11. The method of 10, wherein said alkaline peroxide solution comprises NaOH and H$_2$O$_2$ at a pH of about 11.4 to about 11.6.
12. The method of 10, wherein said alkaline peroxide solution comprises NaOH and H$_2$O$_2$ at a pH of about 11.5.
13. The method of 1, said method comprising treating said extracted hemicellulose with H$_2$O$_2$ at a pH of about 11.2 to about 11.8.
14. The method of 1, said method comprising treating said extracted hemicellulose with H$_2$O$_2$ at a pH of about 11.4 to about 11.6.
15. The method of 1, said method comprising treating said extracted hemicellulose with H$_2$O$_2$ at a pH of about 11.5.
16. The method of 1 or 2, wherein hemicellulose A is separated from hemicellulose B by lowering the pH to about 3.5 to about 4.5 in order to precipitate said hemicellulose A and said hemicellulose B remains in the supernatant, followed by centrifugation or filtration.
17. The method of 16, wherein said hemicellulose B is precipitated from the supernatant with alcohol.
18. The method of 1 or 2, wherein said corn fiber is ground prior to treatment with a-amylase.
19. A hemicellulose B product produced by the method of 1 or 2.

We claim:

1. A process for the preparation of corn fiber gum comprising:
    a) mixing corn fiber with an alkaline solution to form a slurry and extract hemicellulose;
    b) treating the slurry with hydrogen peroxide at a pH of about 10.0 to 12.5 and a temperature of at least about 60° C.; and
    c) separating out the insoluble fractions from the corn fiber slurry to yield corn fiber gum in solution.

2. The process of claim 1, wherein steps (a) and (b) are conducted simultaneously.

3. The process of claim 1, wherein the corn fiber is destarched.

4. The process of claim 3, wherein the corn fiber is destarched by α-amylase.

5. The process of claim 1, wherein step (b) is carried out at a pH of about 11.2 to 11.8.

6. The process of claim 1, wherein the alkaline solution of step (a) is selected from at least one of sodium hydroxide, potassium hydroxide, calcium hydroxide, and magnesium hydroxide.

7. The process of claim 1, wherein the hydrogen peroxide is added in an amount of from about 5 to 20%.

8. The process of claim 1, further comprising precipitating the hemicellulose A by acidifying the slurry such that the hemicellulose A precipitates out and the corn fiber gum remains in solution, and separating out the hemicellulose A precipitate.

9. The process of claim 8, wherein the acidification is to a pH of about 3.5 to 6.0.

10. The process of claim 9, wherein the acidification is carried out between steps (b) and (c).

11. The process of claim 8, wherein the acidification is accomplished by the addition of sulfuric acid.

12. The process of claim 1, wherein step (c) is accomplished by at least one separation technique selected from the group consisting of filtration and centrifugation.

13. The process of claim 12, wherein the separation technique is horizontal decanted and high speed disk centrifugation.

14. The process of claim 1, further comprising a second alkaline hydrogen peroxide treatment after separation of the insoluble fractions.

15. The process of claim 14, further comprising a second separation step after the second alkaline hydrogen peroxide treatment.

16. The process of claim 1, further comprising isolating the corn fiber gum from solution.

17. The process of claim 16, wherein the isolation is accomplished by at least one technique selected from the group consisting of drum drying, freeze drying, spray drying, and alcohol extraction.

18. The process of claim 1, wherein the yield of corn fiber gum is from about 25 to 50% (wt/wt) based upon the destarched corn fiber.

19. The process of claim 18, wherein the yield of corn fiber gum is from about 35 to 50% (wt/wt) based upon the destarched corn fiber.

20. A process for the preparation of corn fiber gum comprising:
   a) destarching corn fiber;
   b) treating corn fiber in an alkaline solution of hydrogen peroxide at a pH of about 10.0 to 12.5 and a temperature of at least about 60° C. to form a slurry and extract hemicellulose;
   c) acidifiying the slurry such that the hemicellulose A precipitates out and the corn fiber gum remains in solution;
   d) separating out the insoluble fractions from the corn fiber slurry to yield corn fiber gum; and
   e) isolating the corn fiber gum from solution.

21. A process for the preparation of corn fiber gum comprising:
   a) destarching corn fiber;
   b) mixing corn fiber with an alkaline solution to form a slurry and extract hemicellulose;
   c) separating out the insoluble fractions from the corn fiber slurry to yield a solution of corn fiber gum;
   d) treating the corn fiber gum solution with hydrogen peroxide at a pH of about 10.0 to 12.5 and a temperature of at least about 60° C.;
   e) acidifiying the corn fiber gum solution such that the hemicellulose A precipitates out and the corn fiber gum remains in solution;
   f) separating out the hemicellulose A precipitate; and
   g) isolating the corn fiber gum from solution.

* * * * *

UNITED STATES PATENT AND TRADEMARK OFFICE
CERTIFICATE OF CORRECTION

PATENT NO. : 6,147,206
DATED : November 14, 2000
INVENTOR(S) : Landis W. Doner, Gregory A. Sweeney and Kevin B. Hicks It is certified that error appears in the above-identified patent and that said Letters Patent are hereby corrected as shown below:

Additional Assignee: The United States of America, as represented by the Secretary of Agriculture Washington, D.C. 20250

Signed and Sealed this

Eighth Day of May, 2001

*Attest:*

NICHOLAS P. GODICI

*Attesting Officer*  Acting Director of the United States Patent and Trademark Office